April 6, 1926.                                                    1,580,018
                            A. G. COOKE ET AL
              STUFFING BOX FOR DRY GAS METERS AND THE LIKE
                            Filed May 25, 1925
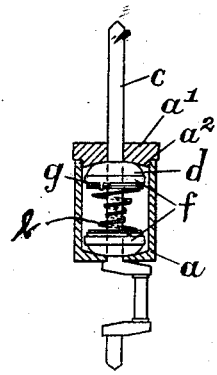
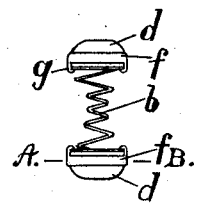
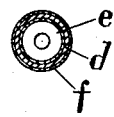
Witnesses.                                              Inventors.

Patented Apr. 6, 1926.

1,580,018

UNITED STATES PATENT OFFICE.

ALBERT GEORGE COOKE, BENJAMIN CHARLES PHILLIPS, AND RUPERT AXE PHILLIPS, OF HOVE, ENGLAND.

STUFFING BOX FOR DRY GAS METERS AND THE LIKE.

Application filed May 25, 1925. Serial No. 32,859.

*To all whom it may concern:*

Be it known that we, ALBERT GEORGE COOKE, BENJAMIN CHARLES PHILLIPS, and RUPERT AXE PHILLIPS, all British subjects, residing at Joymanco (Brighton) Limited, Cambridge Grove, Wilbury Road, Hove, in the county of Sussex, England, have invented new and useful Improvements in Stuffing Boxes for Dry Gas Meters and the like, of which the following is a specification.

This invention relates to certain new and useful improvements in stuffing boxes applicable to gas meters and many other analogous devices, and has for its object to prevent any leakage of gas or liquid.

Our invention applicable to a dry gas meter, comprises a stuffing box of a well known type having enclosed therein an attachment for obviating any leakage of gas when the same is mounted on to the crankshaft, or shafts or spindles connected to the escapement mechanism as the case may be, which divides the gas chamber of the meter from the clock mechanism.

The aforesaid attachment consists of a helical spring, which latter tapers towards the center, and at each respective end is fixed a washer of leather, skin and the like by means of metal hoops, each of said washers are provided with a central aperture, and the complete attachment is inserted into the stuffing box containing a suitable grease, and enclosed therein by a screw cap or cover, and each of said washers are equally pressed against the ends of the stuffing box and provide a springy pad by the tension of the spiral spring thereby preventing an escape of gas as has hitherto known to occur.

In the accompanying drawings, Fig. 1, is a sectional elevation of our invention mounted on a crankshaft; Fig. 2, is an elevation of the attachment and, Fig. 3, is a section on line A—B Fig. 2.

In our invention we provide a stuffing box $a$, with a screw cap or cover $a^1$, of a known kind having the base and screw cover respectively slightly concave on their inner side as shewn at $a^2$, in Fig. 1, and said stuffing box $a$, receives an attachment for preventing any leakage of gas as hereinafter described.

The aforesaid attachment comprises a helical spring $b$, which tapers towards the center in such manner so as to form contact with, for example a crankshaft $c$, when mounted thereon, causing them to rotate bodily as herein set forth. At each respective end of the spring $b$, we fit a washer $d$, of any flexible material, being secured thereto by means of an inner and outer metal hoop $e$, and $f$, whereby the washer $d$, is placed over the inner hoop $e$, and the outer hoop $f$ is then forced thereover causing the said washer $d$, to be partially interposed and compressed near its periphery between the inner and outer hoops $e$, and $f$, and is secured to the respective ends of the spiral spring $b$, by means of clips $g$, integral with the outer hoop $f$, as shewn in Fig. 2.

The above described attachment is inserted inside the stuffing box $a$, together with a suitable grease, and after the screw cap or cover $a^1$, has been screwed thereon each of said washers $d$, respectively will form contact with the concave surfaces $a^2$, and a central aperture is provided in each washer $d$, in alignment with the central aperture in the stuffing box $a$, and screw cap $a^2$, for receiving the crankshaft $c$, and the like as shewn in Fig. 1.

The spring $b$, gives an equal tension on each respective washer $d$, which latter form a springy pad on the concave portions $a^2$, of the stuffing box $a$, and cover $a^1$, and when the complete stuffing box is mounted on to a crankshaft $c$, and the like, the attachment therein will rotate with the same by means of the spring $b$, tapering towards the center, which latter grips the crankshaft $c$, thereby preventing any escape of gas through the crankshafts, or shafts or spindles passing through the partition which divides the gas chamber of the meter from the clock mechanism, and further removes the cause of a gas meter registering against the consumer for gas which has not been consumed.

We have described our invention applicable to dry gas meters, but we do not limit ourselves to this particular device as the same may be adapted for many other devices for the prevention of an escape of gas or liquids.

We claim:

A stuffing box with a screw cover having their inner ends slightly concave receiving a helical spring which latter tapers towards its center, said spring provided with a flexible washer at each end being partially interposed and compressed between two metal hoops, the outermost hoop being integral with clips engaging with the respective ends of said spring, the latter enclosing in said stuffing box with a suitable grease and rotating with a shaft.

ALBERT GEORGE COOKE.
BENJAMIN CHARLES PHILLIPS.
RUPERT AXE PHILLIPS.